（12）United States Patent
Shin et al.

(10) Patent No.: US 8,938,856 B1
(45) Date of Patent: Jan. 27, 2015

(54) DISPLAY DEVICE (71) Applicant: LG Electronics Inc., Seoul (KR)

(72) Inventors: Hyosik Shin, Pyeongtaek-si (KR);
Byeongduk An, Pyeongtaek-si (KR);
Matthew Kim, Pyeongtaek-si (KR);
Seungdon Lee, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/087,750

(22) Filed: Nov. 22, 2013

(30) Foreign Application Priority Data

Jul. 9, 2013 (KR) ................. 10-2013-0080260

(51) Int. Cl.
*E05D 3/06* (2006.01)
(52) U.S. Cl.
CPC ....................... *E05D 3/06* (2013.01)
USPC .............................................. 16/366; 16/365
(58) Field of Classification Search
USPC ........... 16/250, 309, 311, 327, 357, 359, 361, 16/362, 365, 366, 368, 374; 361/679.23, 361/680–683
See application file for complete search history.

(56) References Cited

U.S. PATENT DOCUMENTS

| 4,825,395 | A | * | 4/1989 | Kinser et al. ............. 361/679.09 |
| 5,500,985 | A | * | 3/1996 | Klueger ......................... 16/354 |
| 5,725,279 | A | * | 3/1998 | Ward et al. ................. 297/378.1 |
| 5,966,777 | A | * | 10/1999 | Jantschek ........................ 16/354 |
| 6,519,812 | B2 | * | 2/2003 | Ko et al. ......................... 16/354 |
| 6,539,584 | B1 | * | 4/2003 | Gillotti .......................... 16/371 |
| 7,488,300 | B2 | * | 2/2009 | Houser ........................... 602/16 |
| 7,515,707 | B2 | * | 4/2009 | Ka et al. .................. 379/433.12 |
| 7,832,056 | B2 | * | 11/2010 | Kuwajima et al. ............. 16/354 |
| 2011/0289726 | A1 | * | 12/2011 | Zhang et al. .................... 16/250 |

* cited by examiner

*Primary Examiner* — Roberta Delisle
(74) *Attorney, Agent, or Firm* — Ked & Associates, LLP (57) ABSTRACT

A display device is disclosed. The display device includes a hinge module comprising a pair of hinge shafts arranged side by side, a pair of hinge brackets having one ends coupled to the hinge shafts, respectively, and the other ends in which slide slots are formed, a pair of slide brackets coupled to the slide slots, the slide brackets which are horizontally movable along the slide slots, and a pair of bodies coupled to the slide brackets, respectively, such that the display device may be foldable 0~180 degrees to be folded and unfolded like a book.

14 Claims, 10 Drawing Sheets

DISPLAY DEVICE

Pursuant to 35 U.S.C. §119(a), this application claims the benefit of earlier filing date and right of priority to Korean Application No. 10-2013-0080260, filed on Jul. 9, 2013, the contents of which are hereby incorporated by reference herein in their entirety.

BACKGROUND OF THE DISCLOSURE

1. Field of the Disclosure

Exemplary embodiments of the disclosure relates to a display device including a hinge structure configured to fold a pair of bodies like a book.

2. Discussion of the Related Art

Display devices may be classified based on presence of portability into mobile display devices and mount type display devices. Especially, such a mobile display device is getting smaller and diversified as a liquid crystal display or an organic light emitting diode is applied thereto.

As a touch function is provided to the mobile display device, the mobile display device can realize various functions even without any physical keypad and it may be realized as a multimedia player having multi functions (e.g., photographing a picture or motion picture, playing a music or video file, playing a game and receiving a broadcasting.

As it has a larger screen, the display device may provide more information and the display device having a larger screen is preferred. Due to the portability, the size of the screen is restricted. Accordingly, studies and researches on techniques for enhancing the portability, providing a hinge structure or a sliding structure to reduce an overall volume, have been under progress.

SUMMARY OF THE DISCLOSURE

To overcome the disadvantages, an object of embodiments herewith is to provide a display device including a hinge structure configured to fold a pair of bodies like a book.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a hinge module comprising a pair of hinge shafts arranged side by side; a pair of hinge brackets having one ends coupled to the hinge shafts, respectively, and the other ends in which slide slots are formed; a pair of slide brackets coupled to the slide slots, the slide brackets which are horizontally movable along the slide slots; and a pair of bodies coupled to the slide brackets, respectively.

The pair of the hinge shafts may be rotated in an opposite direction.

The hinge module may further include a pair of rotary plates rotatable along the hinge shafts, the pair of the rotary plates comprising guide projections projected in parallel, respectively; and a guide plate comprising a guide slot extended in a predetermined direction, the guide plate which is a plate-shaped material extended longitudinally, and the guide projections may be inserted in the guide slot and slide along the guide slot.

A distance between both ends of the guide slot may be corresponding to a spaced distance between the hinge shafts.

The guide projections may be formed in opposite to the hinge bracket with respect to the hinge shafts.

The guide slot may include a first slot and a second slot longitudinally arranged with the guide plate, in parallel; and a vertical guide pin provided between the first slot and the second slot, and the hinge module may include a vertical slot provided between the first rotary plate and the second rotary plate and moves with the vertical guide pin inserted therein.

The hinge module may further include a hinge housing configured to cover an outer circumferential portion of the hinge shafts, and right and left portions of the hinge housing may have curved surfaces having the same distance to the closer one of the hinge shafts.

A predetermined portion of the slide bracket toward the slide bracket may include a concave surface having a curvature corresponding to the curved surface of the hinge housing.

The portion of the slide bracket may be formed of a flexible material having a force of restitution.

One end of the slide bracket may have a variable distance to the hinge module, when sliding with respect to the hinge bracket.

The display device may further include a slide restricting portion provided between the bodies, with being bent in a U-shape.

One end of the slide restricting portion may be positioned in one body and the other end may be positioned in the other body and a middle bent portion may be positioned in the hinge module.

A distance (a) between the hinge shafts may be more than two times than a distance (b) from one end of the body to the portion connected with the hinge shaft and more than a length of a diagonal line of a right-angled triangle formed by a thickness (c) of the body as a base line and a height.

A horizontally moving distance of the slide bracket may be a value or less which is calculated by subtracting the distance from one end of the body to the portion connected with the hinge shaft from a half of the distance (a) between the hinge shafts.

A predetermined portion of the body may include an inserting portion having a size corresponding to a size of the hinge module.

According to at least one of the exemplary embodiments of the present disclosure described above, the display device may be foldable 0~180 degrees and it can be folded and unfolded like a book.

Furthermore, the display device may slide in a horizontal direction and the distance between the displays may be reduced. Accordingly, the display device 100 may provide a continuous screen, using the two displays.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DESCRIPTION OF SPECIFIC EMBODIMENTS

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer or section. Thus, a first element, component, region, layer, or section discussed below could be termed a second element, component, region, layer, or section without departing from the teachings of the present disclosure.

It will be understood that when an element or layer is referred to as being "on", "connected to", or "coupled to" another element or layer, it can be directly on, connected, or coupled to the other element or layer or intervening elements or layers may be present. In contrast, when an element is referred to as being "directly on", "directly connected to", or "directly coupled to" another element or layer, there are no intervening elements or layers present.

The terminology used herein is for the purpose of describing exemplary embodiments only and is not intended to be limiting of the disclosed subject matter. As used herein, the singular forms "a", "an", and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that suffixes "module" and "part" when used in this specification, are used only in consideration of convenience in making specification and they should not be distinguished from each other in meanings or functions.

Hereinafter, exemplary embodiments of the disclosed subject matter will be described in detail with reference to the accompanying drawings. Referring to the accompanying drawings, a display device 100 according to one embodiment of the present invention will be described in detail as follows. Reference may now be made in detail to specific embodiments, examples of which may be illustrated in the accompanying drawings. Wherever possible, same reference numbers may be used throughout the drawings to refer to the same or like parts.

Figure 1:
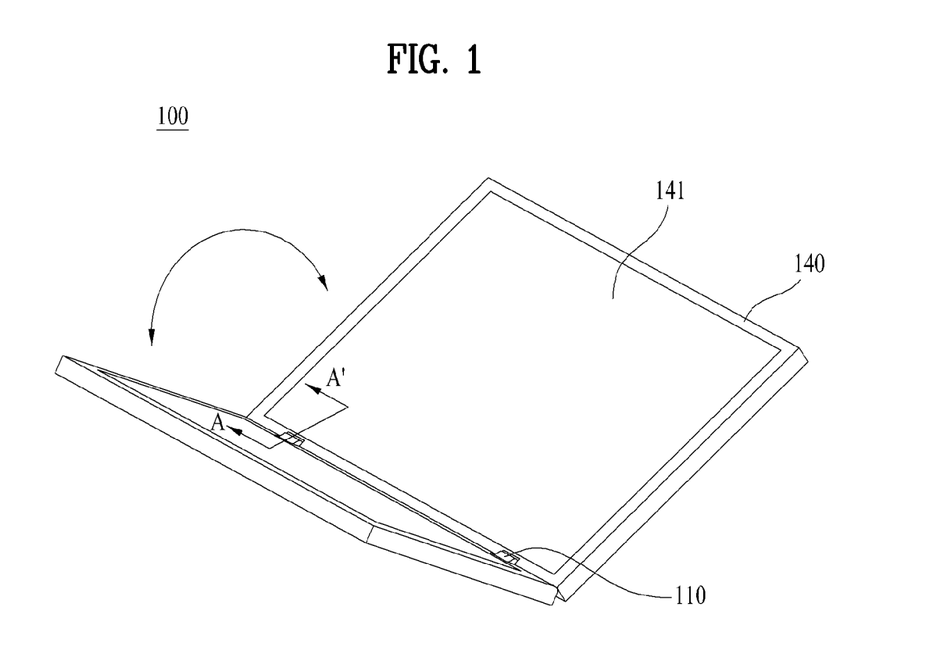
FIG. 1 is a perspective diagram illustrating a display device according to one embodiment of the disclosure.

FIG. 1 is a perspective diagram illustrating a display device according to one embodiment of the disclosure. Referring to FIG. 1, the display device 100 may include two bodies 140 and only one of the bodies 140 may include a display 141 or the bodies 140 may include displays 141, respectively.

To satisfy conflicting request for a large screen and portability, the present disclosure may provide the display device 100 including two bodies in which displays 141 are provided, respectively, in a foldable structure for folding the two bodies. The structure of the display may enhance portability and a large screen.

When the display device 100 having a conventional hinge structure is unfolded, the two bodies 140 are spaced apart a predetermined distance and it is then difficult to realize a continuous screen. Also, the display device 100 having the conventional hinge structure has to be unfolded in a large size to allow the user to view a screen.

The present disclosure may provide 360-degree foldable hinge structure such that the user can fold the display device in half like a book or a newspaper. When the display device is unfolded completely, the distance between the two bodies 140 may be minimized in the display device according to exemplary embodiments of the disclosure and a continuous screen may be realized.

Exemplary embodiments show the two bodies 140 include two displays. Alternatively, exemplary embodiments of the disclosure may provide a laptop display device 100 including two bodies 140 of which one includes a display and the other one includes a keyboard.

Figure 2:
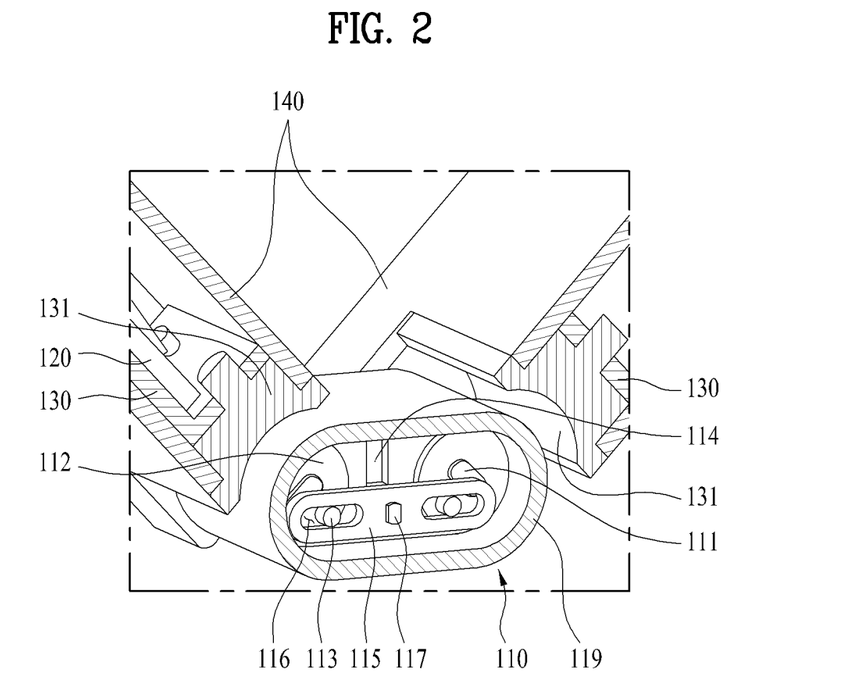
FIG. 2 is a perspective diagram illustrating A-A' cross section of FIG. 1.
Figure 3:
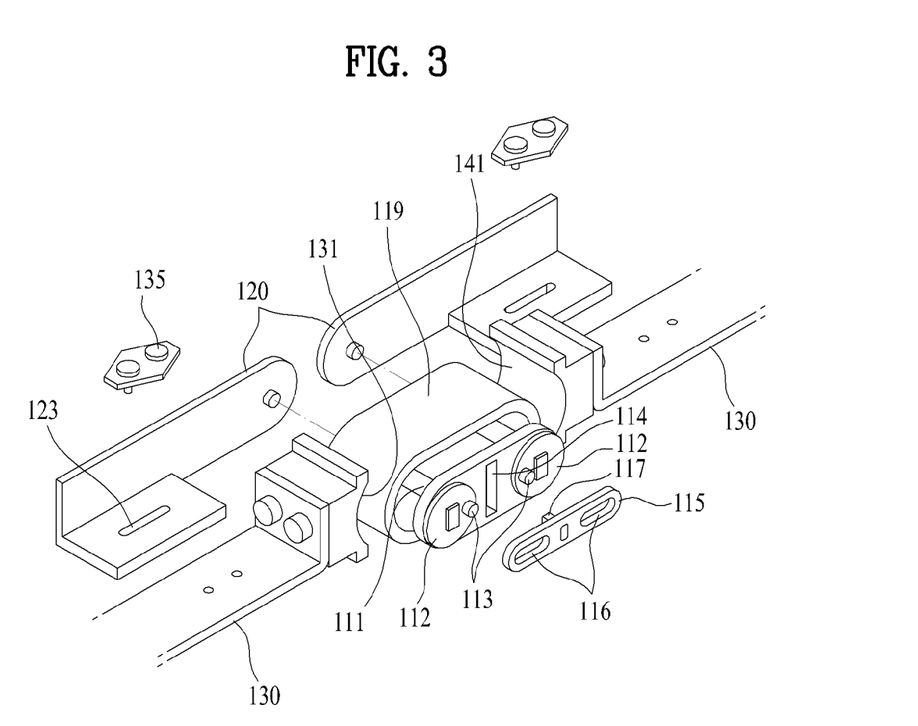
FIG. 3 is an exploded perspective diagram illustrating a hinge module, a hinge bracket and a slide bracket provided in the display device according to one embodiment of the disclosure.

FIG. 2 is a perspective diagram illustrating A-A' cross section of FIG. 1, showing a hinge module 110, a hinge bracket 120 and a slide bracket 130. FIG. 3 is an exploded perspective diagram of the hinge module 110, the hinge bracket 120 and the slide bracket 130.

The hinge module 110 may include a pair of hinge shafts 111 arranged side by side, spaced apart a predetermined distance from each other, such that the two bodies 140 may not be interfered with each other when making a hinge motion. The distance between the pair of the hinge shafts 111 will be described later.

The hinge module 110 may further include a hinge housing 119 to prevent the hinge shafts 111 from being exposed outside. Right and left portions of the hinge housing 119 have a curved surface formed identically far from the hinge shafts. When the right and left portions of the hinge housing 119 are formed linearly, the slide bracket 130 and the hinge housing 119 might be collided with each other in rotating the hinge bracket 120. When the right and left portions of the hinge hosing 119 are formed curvedly, the hinge bracket can rotate naturally.

A concave surface 131 corresponding to the curved surface of the hinge housing 119 may be formed in a predetermined portion of the slide bracket 130 toward the hinge module 110, such that the slide bracket 130 can be close to the hinge housing 119 of the hinge module 110 when the slide bracket 130 is sliding toward the hinge module 110.

The concave surface 131 of the slide bracket 130 may be formed of a flexible material (e.g., rubber and silicon) to prevent the noise generated by the collision with the hinge module 110 during the sliding motion.

One end of the hinge bracket 120 is coupled to the hinge shafts 111 to make the hinge bracket 120 rotate and the other end includes a slide slot 123 to make the hinge bracket 120 coupled to the slide bracket 130. In other words, the slide bracket 130 may be coupled to the slide slot 123 of the hinge bracket 120 to make the sliding motion along a longitudinal direction of the slide slot 123.

A coupling hole 135 may allow the slide bracket 130 and the hinge bracket 120 coupled to each other by a wide margin such that the slide bracket 130 may slide smoothly.

The bodies 140 in which the displays 141 or various components are mounted may be coupled to the slide bracket 130. The distance between the bodies may be changed along the sliding motion of the slide bracket 130.

While the slide bracket 130 is rotating on the hinge shafts 111, one of the bodies 140 may be distant from the other one to prevent the collision between the bodies 140. When the display device 100 is unfolded, the distance between the displays 141 could interfere with screen unity. Accordingly, the two bodies 140 may be connected by the slide bracket 130.

The pair of the hinge shafts 111 may be rotary, moving the same angle in opposite directions, such that the angle between one body 140 and the hinge module may be the same as the angle between the other body 140 and the hinge module. To rotate the hinge shafts 111 the same angle in the opposite direction, rotary plates 112 rotatable along the hinge shafts 111 may be provided in the hinge shafts 111, respectively, and the rotary plate 112 includes a guide projection 113 projected in parallel with the hinge shafts 111.

The rotary plates 112 may be controlled to rotate the same angle in the opposite directions by adjusting positions of the guide projections 113. To adjust the position of the guide projections 113, a guide plate 115 may be provided and the guide plate 115 may be a plate-shaped member extended horizontally. The guide plate 115 may include a guide slot 116 formed longitudinally with respect to the guide plate 115. The guide projection 113 is fitted to the guide slot 116 to move within the guide slot 116.

The guide plate 115 is rotated together with the guide projection 113 rotated when the hinge shafts 111 are rotated. The rotation is combined with a vertical motion element and a horizontal motion element as shown in FIGS. 2 and 3. The guide projection 113 may be horizontally moved along the guide slot 116 by the horizontal motion element and the guide plate 115 may be horizontally moved by the horizontal motion element.

The guide projection 113 may be rotated 180 degrees and the two guide projections 113 may be rotated 180 degrees, respectively, such that the distance between the bodies 40 may be variable in a range of 0~360 degrees.

It is shown that the guide projections 113 are positioned in opposite to the hinge bracket 120 with respect to the hinge shafts 111 and exemplary embodiments of the disclosure are not limited thereto. The guide projections may be formed side by side in symmetry. When the guide projections 113 are positioned in opposite to the hinge bracket 120 with respect to the hinge shafts 111, the guide projections 113 are rotated 180 degrees toward the inside between the hinge shafts 111 as shown in FIGS. 4, 5, 6, 7, 8, 9, 10 and 11. At this time, the maximum distance between the guide projections 113 may be the distance between the hinge shafts 111.

When they are positioned in the same direction of the hinge bracket 120, the guide projections 113 are rotated 180 degrees in an outer direction with respect to the hinge shafts 111*l*. At this time, the distance between the guide projections 113 may be farther than the distance between the guide projections 113 positioned in the opposite directions. The guide plate 115 has to be longer and it cannot move within the housing 119 as shown in FIGS. 2 and 3, when the guide plate 115 is moved upward. Accordingly, it is preferred that the guide projections are positioned in the opposite direction with respect to the hinge bracket 120.

A vertical guide pin is projected from the guide plate 115 to prevent the guide plate 115 from shaking in a horizontal direction in moving vertically. The vertical guide pin may be inserted in a vertical slot 114 provided between the two rotary plates 112 to prevent the guide plate 115 from moving horizontally.

Figure 4:
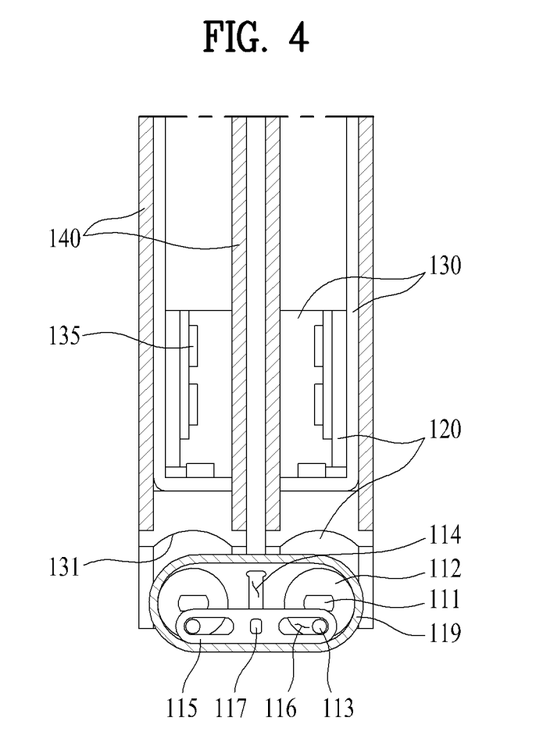
FIG. 4 is a longitudinal sectional diagram illustrating a state where the display device according to one embodiment is folded 0°.

FIG. 4 is a longitudinal sectional diagram illustrating a state where the display device 100 according to one embodiment of the disclosure is folded 0 degree.

In the state where the display device 100 including the two displays 141 is folded 0 degree as shown in FIG. 4, the display device 100 is folded with the displays 141 facing each other for portability. At this time, the guide projection 113 may be provided in a lower portion shown in the drawing and the guide plate 115 may be provided in the lower portion.

Figure 5:
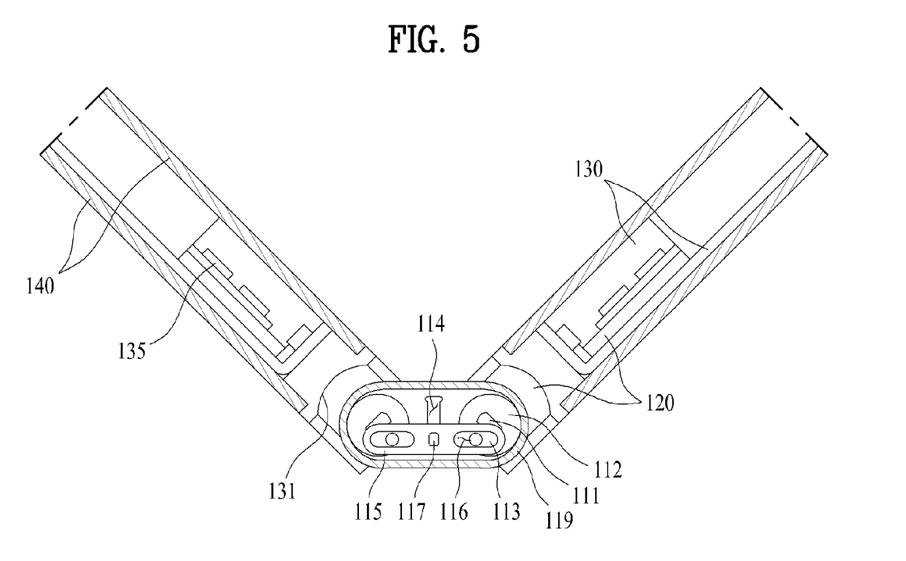
FIG. 5 is a longitudinal sectional diagram illustrating a state where the display device according to one embodiment is folded 90°.

FIG. 5 is a longitudinal sectional diagram illustrating a state where the display device 100 according to one embodiment of the disclosure is folded 90 degrees. When the angle between the bodies 40 is 90 degrees, the hinge brackets 120 are rotated 45 degrees and the guide projections 113 are rotated 45 degrees as shown in FIG. 5.

Figure 6:
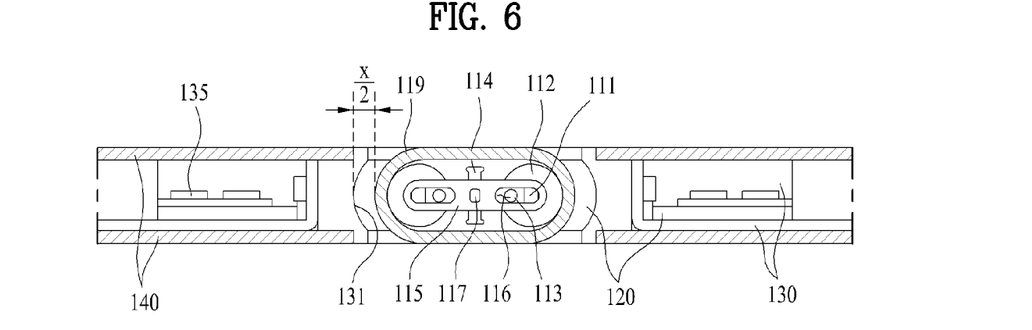
FIG. 6 is a longitudinal sectional diagram illustrating a state where the display device according to one embodiment is unfolded 180°.
Figure 8:
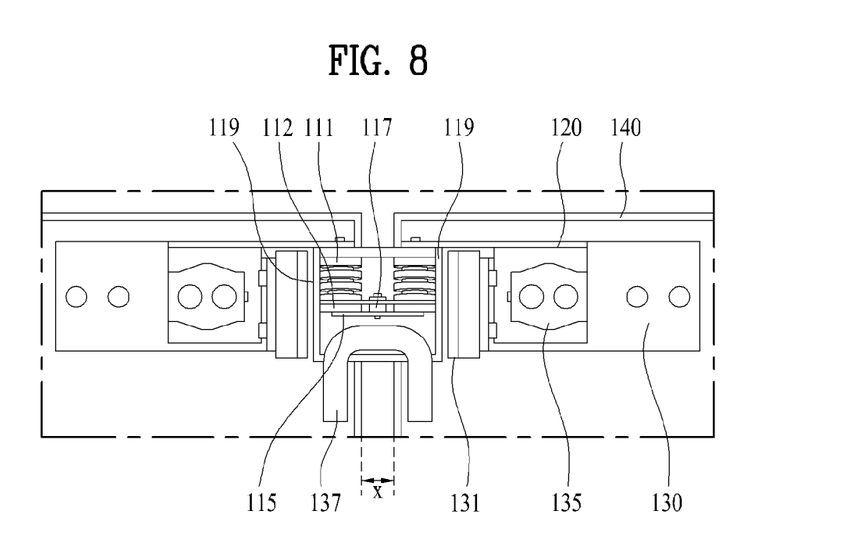
FIG. 8 is a horizontal sectional diagram of FIG. 6.

FIG. 6 is a longitudinal sectional diagram illustrating a state where the display device 100 according to one embodiment of the disclosure is unfolded 180 degrees. FIG. 8 is a horizontal sectional diagram. When the display device 100 is unfolded more in the state of FIG. 5, the display device is in a state shown in FIG. 6. At this time, a gap (x) could be generated between the two bodies 140 as shown in FIG. 8 disadvantageously.

When such a gap is generated between the bodies 140, a gap might be generated between the two displays 141 and the uniformity could deteriorate. When the user is holding one of the bodies 140, the hinge could be rotated by the weight of the other body and the 180-degree rotated state cannot be kept disadvantageously.

Figure 7:
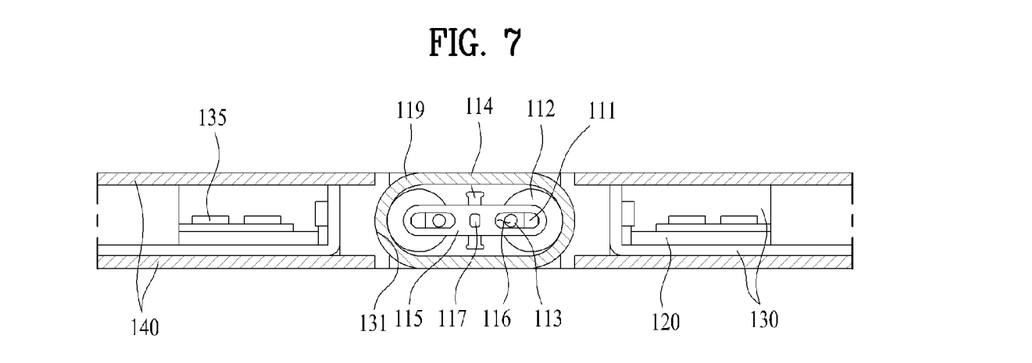
FIG. 7 is a longitudinal sectional diagram illustrating the slide bracket which is moved inward in a state where the display device according to one embodiment is unfolded 180°.
Figure 9:
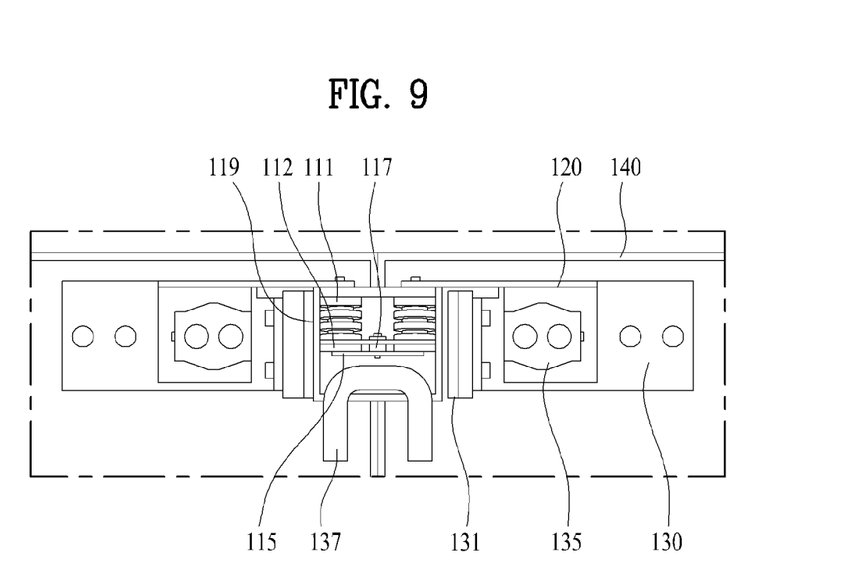
FIG. 9 is a horizontal sectional diagram of FIG. 7.

FIG. 7 is a longitudinal sectional diagram illustrating the display device 100 according to one embodiment of the disclosure is sliding inward in a state where the display device 100 is unfolded 180 degrees. FIG. 9 is a horizontal sectional diagram of FIG. 7. To keep the 180-degree unfolded state while reducing the distance between the bodies 140, the two bodies 140 are sliding inward to reduce the distance between the bodies 140 as much as possible.

While reducing the distance between the bodies 140, the distance between the displays 141 are reducing and lateral surfaces of the bodies 140 contact with each other as shown in FIG. 7. Accordingly, the folded state of the bodies 140 is kept with the hinge bracket 120 not rotated on the hinge shafts 111.

FIG. 8 is a horizontal sectional diagram of FIG. 6 and FIG. 9 is a horizontal sectional diagram of FIG. 7. When the bodies 140 are sliding inward in a state where the two bodies 140 are spaced apart after rotated, the distance between the bodies 140 is reduced as shown in FIG. 9. The hinge module 110 and the hinge bracket 120 are not moved, while the slide bracket 130 coupled to the slide slot 123 and the bodies 140 are moved.

A moving distance of the slide bracket 130 and the bodies 140 may be restricted by the length of the slide slot 123 provided in the hinge bracket 120. When a predetermined force is applied to the slide slot 123 during every motion of the slide bracket 130, there is concern about abrasion. To compensate the abrasion, U-shaped slide restricting portion 137 shown in FIGS. 8 and 9 maybe further provided. The slide restricting portion 137 has an end provided in one body 140, the other end provided in the other body 140 and a bent middle portion provided in the housing 119 of the hinge module 110 such that the user cannot see the slide restricting portion 137, even in a distant state.

Figure 10:
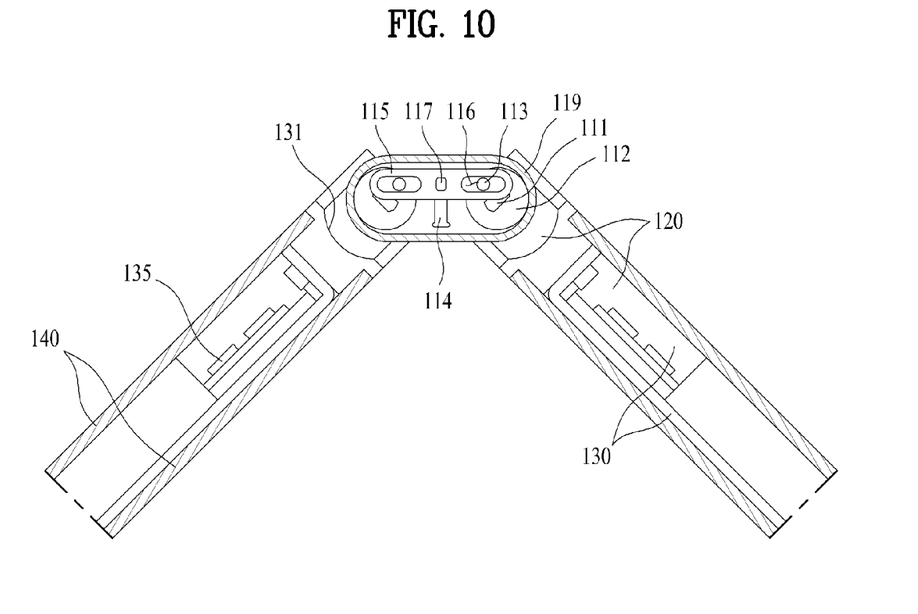
FIG. 10 is a longitudinal sectional diagram illustrating a state where the display device according to one embodiment is folded 270°.
Figure 11:
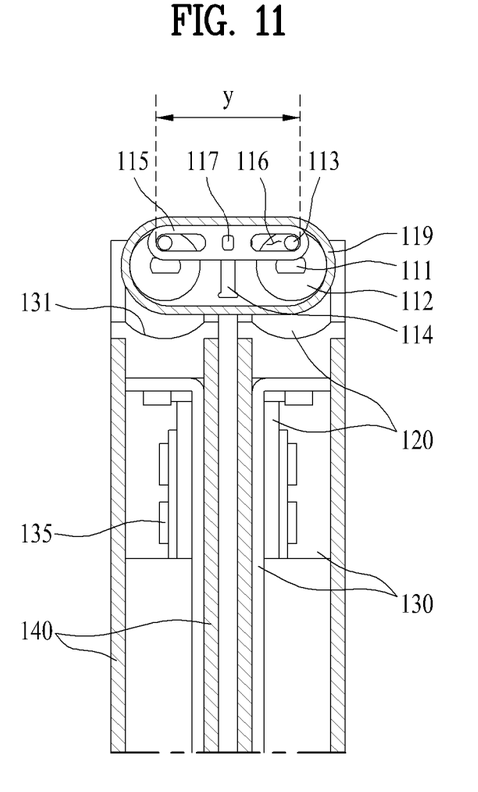
FIG. 11 is a longitudinal sectional diagram illustrating a state where the display device according to one embodiment is folded 360°.

To rotate the bodies 140 again after sliding inward as shown in FIG. 7, the bodies 140 are rotated after pulled outward as shown in FIG. 6. FIG. 10 is a sectional diagram illustrating a state where the display device 100 is folded 270 degrees and FIG. 11 is a longitudinal sectional diagram illustrating a 360-degree folded state of the display device. The state of the display device 100 shown in FIGS. 10 and 11 is similar to the state shown in FIGS. 4 and 5, except an up-and-down direction, and detailed description of the state will be omitted accordingly.

Referring to FIGS. 4, 5, 6, 7, 8, 9, 10 and 11, the guide plate 115 is moving vertically and the guide projections 113 are moving between the shafts 111 from a lower portion to an upper portion. The guide projections 113 are horizontally moving along the guide slot 116 and the guide projections 113 are rotated inward with respect to the hinge shafts 111. A distance (y) between a left end and a right end of the guide slot 116 may be formed, considering the distance between the shafts 111.

More specifically, when the distance between the hinge shafts 111 is larger than a diameter of the guide projection 113, the guide projection 113 may move freely along the guide slot 116 during the rotation of the display device 100 in a range of 0 to 360 degrees.

Figure 12:
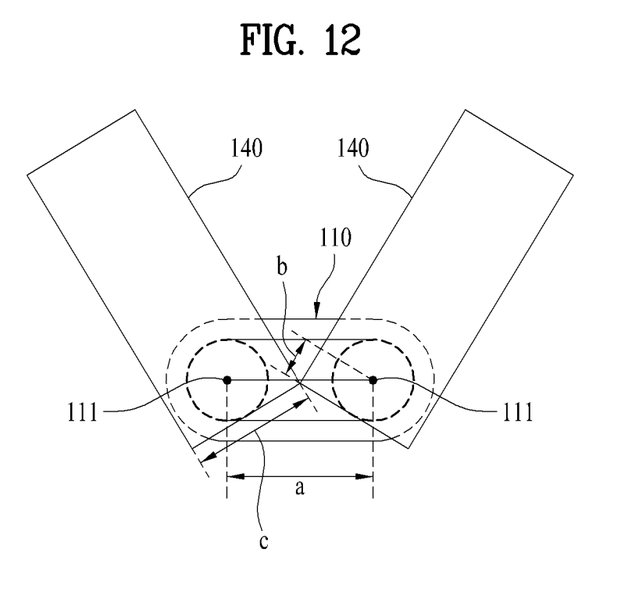
FIG. 12 is a side view illustrating a hinge portion of the display device according to one embodiment of the disclosure.

FIG. 12 is a side view illustrating the hinge module 110 according to exemplary embodiments of the disclosure, showing the bodies 140 positioned most closely with each other. A predetermined minimum distance is required between the hinge shafts 111 to prevent corners of the bodies 140 from colliding with each other while the bodies 140 are rotated on the hinge shafts 111.

The distance (a) between the hinge shafts 111 is more than two times than the length of a diagonal line of a right-angled triangle formed by a distance from the hinge shaft 111 to an end of the body 140 and a half of the thickness (c) of the body 140. In other words, a minimum value of the distance (a) between the hinge shafts 111 can be calculated from a following formula:

$$a = \sqrt{(2b)^2 + c^2}$$

A multiple of the distance (b) from the hinge shaft 111 to one end of the body 140 is the same as a value gained by subtracting the distance (d) between the bodies from the distance (a) between the hinge shafts 111, which can make a following formula:

$$a^2 = (a-b)^2 + c^2$$

Another formula using the formula mentioned above associated with "a" will be made as follows:

$$a = \frac{(c^2 + d^2)}{2c}$$

Figure 13:
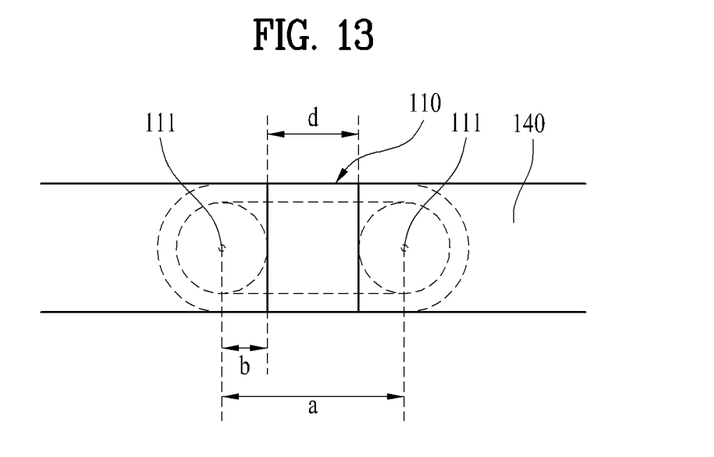
FIG. 13 is a side view illustrating a state where the display device according to one embodiment is unfolded 180°.

A moving distance of the slide bracket 130 or the bodies 140 is also associated with the distance (a) between the hinge shafts 111 and a distance (b) from the hinge shafts 111 to ends of the bodies 140. Referring to FIG. 13, a spaced distance (d) is a value calculated by subtracting a double value of the distance (b) from the hinge shafts 111 to the ends of the bodies 140 from a value of the distance (a) between the hinge shafts 111.

Accordingly, the moving distance (d/2) of the slide bracket 130 or the bodies 140 may be a value calculated by subtracting the distance (b) from the end of the bodies to portions connected with the hinge shafts 111 from a half of the distance (a) between the shafts 111.

According to at least one of the exemplary embodiments of the present disclosure described above, the display device 100 may be foldable 0~180 degrees and it can be folded and unfolded like a book.

Furthermore, the display device 100 may slide in a horizontal direction and the distance between the displays may be reduced. Accordingly, the display device 100 may provide a continuous screen, using the two displays.

It will be apparent to those skilled in the art that various modifications and variations can be made in the present disclosure without departing from the spirit or scope of the disclosed subject matter. Thus, it is intended that the present disclosure cover the modifications and variations of the disclosed subject matter provided they come within the scope of the appended claims and their equivalents.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a hinge module comprising a pair of hinge shafts arranged side by side, a pair of rotary plates rotatable along the hinge shafts, the pair of the rotary plates comprising guide projections projected in parallel, respectively; and
   a guide plate comprising a guide slot extended in a predetermined direction, the guide plate is extended longitudinally, and the guide projections are inserted in the guide slot and slide along the guide slot during the rotary plates rotating;

a pair of hinge brackets having one ends coupled to the hinge shafts, respectively, and the other ends in which slide slots are formed;

a pair of slide brackets coupled to the slide slots, the slide brackets which are horizontally movable along the slide slots; and a pair of bodies coupled to the slide brackets, respectively.

2. The display device according to claim 1, wherein the pair of the hinge shafts are rotated in an opposite direction.

3. The display device according to claim 1, wherein a distance between both ends of the guide slot is corresponding to a spaced distance between the hinge shafts.

4. The display device according to claim 1, wherein the guide projections are formed in opposite to the hinge bracket with respect to the hinge shafts.

5. The display device according to claim 1,
wherein the guide slot comprises, a first slot and a second slot longitudinally arranged with the guide plate, in parallel; and a vertical guide pin provided between the first slot and the second slot,
wherein the hinge module comprises a vertical slot provided between the first rotary plate and the second rotary plate, and
wherein the vertical guide pin inserted the vertical slot and move along the vertical slot.

6. The display device according to claim 1, wherein the hinge module further comprises,
a hinge housing configured to cover an outer circumferential portion of the hinge shafts, and
right and left portions of the hinge housing have curved surfaces having the same distance to the closer one of the hinge shafts.

7. The display device according to claim 6, wherein a one end of the slide bracket toward the hinge module comprises a concave surface having a curvature corresponding to the curved surface of the hinge housing.

8. The display device according to claim 7, wherein the portion of the slide bracket is formed of a flexible material having a restoring force.

9. The display device according to claim 1, wherein one end of the slide bracket has a variable distance to the hinge module, when sliding along the slide slot with respect to the hinge bracket.

10. The display device according to claim 9, further comprising:
a slide restricting portion provided between the bodies, with being bent in a U-shape.

11. The display device according to claim 10, wherein one of the slide restricting portion is positioned in one body and the other end is positioned in the other body and a middle bent portion is positioned in the hinge module.

12. The display device according to claim 1, wherein a distance (a) between the hinge shafts is a value gained after dividing the sum of the squares on the distance (d) between the two bodies and the thickness (c) of the bodies by a multiple of the thickness (c) of the bodies ($a=(c^2 \times d^2)/(2c)$).

13. The display device according to claim 12, wherein a horizontally moving distance of the slide bracket is less than a half of the distance (d) between the bodies.

14. The display device according to claim 1, wherein a predetermined portion of the body comprises an inserting portion having a size corresponding to a size of the hinge module.

* * * * *